Aug. 2, 1927.
B. R. KRALIK
1,637,617
BAKING UTENSIL
Filed Sept. 14, 1925
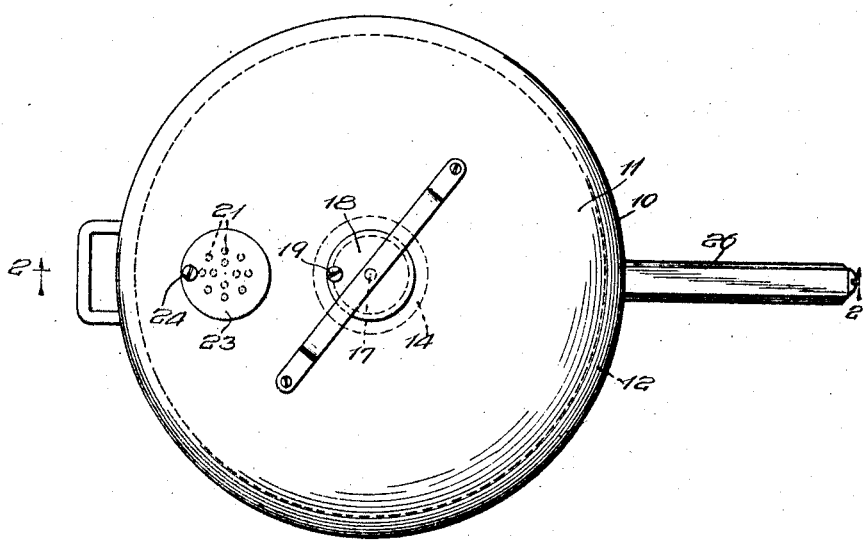
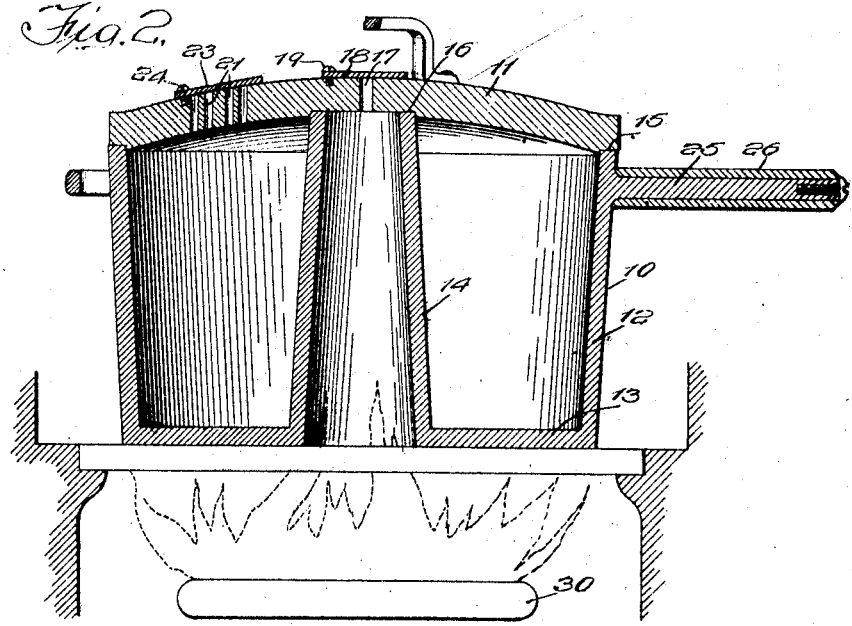
Witnesses:
William P. Kilroy
Harry R. L. White
Inventor:
Blanche Ring Kralik
By Hill & Hill
Attys Patented Aug. 2, 1927.

1,637,617

UNITED STATES PATENT OFFICE.

BLANCHE RING KRALIK, OF CHICAGO, ILLINOIS.

BAKING UTENSIL.

Application filed September 14, 1925. Serial No. 56,362.

My invention relates to baking utensils and particularly to utensils for baking over an open flame as distinguished from baking utensils which must be placed in an oven if good results are to be obtained.

The invention has among its other objects the provision of devices of the kind described which are simple in construction, convenient, durable, efficient and satisfactory for use wherever found applicable.

One form of the invention is embodied in a pan provided with a cover, both the pan and cover being provided with relatively thick walls formed of a metal having a relatively high specific heat or capacity for heat. The pan has a tubular center core, the upper end of which fits snugly in a recess formed in the cover.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawing, wherein like reference characters indicate like or corresponding parts:

Figure 1 is a plan view of a utensil embodying the features of my invention; and Figure 2 is a section taken on line 2—2 of Figure 1, the improved utensil being shown in connection with a conventional burner.

In the drawing I have shown a preferred form of the invention embodied in a utensil comprising a pan 10 having a removable cover 11. The pan 10 is particularly adapted for baking cakes and the like and preferably comprises a frustro-conical wall 12, a bottom wall 13 and a tapering tubular center core 14. Obviously, a cake may be readily removed from the pan 10 after it has been baked therein. The cover 11 is preferably provided with an annular groove 15 adapted to receive the upper edge of the frustro-conical wall 12. It will be noted that the tubular core 14 projects above the wall 12 and fits snugly within a recess 16 formed in the underside of the cover 11. An aperture 17 may be provided in the cover 11 and may be provided with a closure member 18 pivotally secured to the cover 11 by a screw 19. This will permit the escape of burned gases from the core through the cover if so desired. The cover 11 is preferably provided with a plurality of perforations or apertures 21 through which steam may escape from the interior of the pan. A closure member 23 pivotally secured to the cover 11 by a screw 24 may be adjusted to regulate the flow of steam through the apertures 21. Formed integral with the pan 10 is a handle 25 provided with a cover 26 which may be formed of any suitable heat insulating material.

As shown in the drawing, the cover 11 and the walls of the pan 10 are extremely thick. In practice, I prefer to make the several walls of the pan 10 of the same thickness, these walls being preferably from $\frac{3}{16}$ of an inch to $\frac{5}{16}$ of an inch in thickness. The cover 11 is preferably thicker than the walls of the pan 10, the cover being preferably from $\frac{1}{4}$ to $\frac{3}{8}$ of an inch in thickness. The pan and cover are preferably made from aluminum, but may be made from any other metal having a relatively high specific heat or capacity for heat. This construction permits the improved utensil to be used in baking cakes over an open flame, as the thick walls of the cover and pan insure that the cake will be subjected to a relatively high temperature. I have found that a cake baked in my improved utensil over an open flame will have its upper surface thoroughly browned. In effect, my improved utensil is a small oven.

It has been the common practice heretofore to employ baking utensils having relatively thin walls which have been placed in ovens so that the heat from the burner or burners is dissipated to the surrounding air. Obviously, such baking utensils impart any desired form to the cake, but do not aid materially in subjecting the cake to heat. The thick walls of my improved construction insure that a relatively large amount of heat will be absorbed by the pan and will be conducted to the cake. The temperature within the pan may be regulated by means of the closure member 23, it being preferable in some instances to subject the cake to the steam which collects below the cover 11. The temperature within the tubular core 14 may be regulated to some extent by means of the closure member 18. The manner in which the improved utensil is used is illustrated in Fig. 2, wherein I have indicated a conventional burner at 30.

Having thus described my invention, it is obvious that various immaterial modifica- tions may be made in the same without departing from the spirit of my invention; hence I do not wish to be understood as limiting myself to the exact form, construction arrangement and combination of parts herein shown and described or uses mentioned.

What I claim as new and desire to secure by Letters Patent is:

1. A cooking utensil comprising a pan-like body having relatively thick walls for the sides and bottom, a tubular center core open at both ends and tapering throughout its length with its walls of the same thickness as the sides and bottom of the body, a relatively thick cover for the body and core having a tight fitting joint with the top of the core, said cover having perforations therethrough communicating with the pan body and an aperture communicating with the core, and means carried by the cover for controlling the passage of heat and steam through the perforations and aperture.

2. A cooking utensil comprising a body having relatively thick bottom and side walls, a tubular center core open at both ends and having its wall of a thickness equal to the thickness of the walls of the body, the upper end of said core extending beyond the upper edge of the body, a cover for the body having a tight fitting joint with the upper end of the core, said cover having perforations therethrough communicating with the body and an aperture communicating with the core, and movable closure members carried by the cover for controlling the passage of heat and steam through the perforations and said aperture.

In testimony whereof, I have hereunto signed my name.

BLANCHE RING KRALIK.